(12) United States Patent
Agarwal

(10) Patent No.: US 10,175,084 B2
(45) Date of Patent: Jan. 8, 2019

(54) FLAT MEASURING APPARATUS WITH PLURALITY OF HINGES

(71) Applicant: Rahul Agarwal, Kolkata (IN)

(72) Inventor: Rahul Agarwal, Kolkata (IN)

(*) Notice: Subject to any disclaimer, the term of this patent is extended or adjusted under 35 U.S.C. 154(b) by 79 days.

(21) Appl. No.: 15/181,672

(22) Filed: Jun. 14, 2016

(65) Prior Publication Data

US 2016/0370218 A1    Dec. 22, 2016

Related U.S. Application Data

(60) Provisional application No. 62/180,594, filed on Jun. 16, 2015.

(51) Int. Cl.
*G01F 22/00* (2006.01)

(52) U.S. Cl.
CPC .................... *G01F 22/00* (2013.01)

(58) Field of Classification Search
None
See application file for complete search history.

(56) References Cited

U.S. PATENT DOCUMENTS

| | | | | |
|---|---|---|---|---|
| 3,003,678 A | * | 10/1961 | Chase | B65D 5/46088 229/108 |
| 6,279,818 B1 | * | 8/2001 | Kim | B65D 5/0005 229/101 |
| 6,568,587 B1 | * | 5/2003 | Yamada | G01F 19/00 116/227 |
| 7,882,737 B2 | * | 2/2011 | Coats | B65D 5/103 229/117.34 |
| 9,221,582 B2 | * | 12/2015 | Wheeler | B65D 21/086 |
| 2009/0183565 A1 | * | 7/2009 | Shamoon | G01F 19/00 73/426 |
| 2015/0251808 A1 | * | 9/2015 | Tsui | A45F 3/20 220/8 |

* cited by examiner

*Primary Examiner* — Peter Macchiarolo
*Assistant Examiner* — Jermaine Jenkins
(74) *Attorney, Agent, or Firm* — Brundidge & Stanger, P.C.

(57) ABSTRACT

The present disclosure relates to a flat apparatus for measuring volume of a substance formulated in any or combination of a solid formulation, a liquid formulation, a semi-solid formulation, a semi-liquid formulation. The apparatus has a surface with defined measurement markings, hinges configured to bend the apparatus according to determined by marking of measurements and create predetermined capacity to hold a substance.

6 Claims, 8 Drawing Sheets

FLAT MEASURING APPARATUS WITH PLURALITY OF HINGES

FIELD OF THE INVENTION

The present disclosure relates to a measuring apparatus.

BACKGROUND

The background description includes information that may be useful in understanding the present invention. It is not an admission that any of the information provided herein is prior art or relevant to the presently claimed invention, or that any publication specifically or implicitly referenced is prior art.

Tools for measuring accurate quantities of solids and liquids are commonplace—in kitchens, shops, labs, and almost every other scenario where some activity requiring substances of specific amounts be utilized.

Existing solutions such as measuring cups and spoons are enclosures in which required substances can be placed and measured. But while storing away when not in use, these enclosures occupy a lot of space.

Most of these solutions have different tools for different quantities of measurement. The ones which are adjustable, have several parts, increasing their complexity. Thus, both types of solutions require more than a single physical part to be able to measure more than one quantity of measurement.

Though solutions like transparent measuring cups with multiple marked levels can measure different quantities, they require a tedious process of filling-emptying-filling-emptying to achieve the desired quantity of the substance, not as easy as filling up a mound in a spoon and then clearing off the extra from the brim.

Such tools are also difficult to clean because of their nature of being an enclosed space that is difficult to access. There is, therefore, a need in the art for a system and method for a simpler, more portable tool, which is cost effective and offers something fresh in this saturated space.

All publications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

SUMMARY

The present invention seeks to provide a flat apparatus for measuring volume of different substances formulated in any or a combination of a solid formulation, a liquid formulation, a semi-solid formulation, a semi-liquid formulation. The apparatus can include a plurality of marked hinges that can be used to bend the apparatus. Bent portion of the apparatus acts as a scoop capacity of predetermined volume to fill the substance, whereas the other portion works as handle.

In an aspect, the plurality of hinges can comprise a first hinge and a second set of hinges. The second set of hinges can include a plurality of groups of hinges such as a first group, a second group, a third group and a fourth group.

In an aspect, bending of the flat apparatus along a group of second set of hinges such as the first group in combination with the first hinge creates a predetermined capacity to hold a substance which can be used for purpose of measuring.

In an aspect, different groups of the second set of hinges in combination with the first hinge can enable the flat apparatus to provide a different predetermined capacity to hold a substance. Thus the disclosed apparatus can enable measurement of different quantities of a substance.

In an aspect, the apparatus surface can include measuring marks that can help in bending the apparatus to get appropriate space meeting a user's requirement. Thus the proposed apparatus allows desired volumetric measurement to be set according to which of the hinges are flexed.

In an aspect, flattening of the apparatus allows for convenient storage and cleaning.

In an aspect, the apparatus of the present disclosure can be realized with a single piece of material, which makes it cost-effective and easy to handle.

Various objects, features, aspects and advantages of the inventive subject matter will become more apparent from the following detailed description of preferred embodiments, along with the accompanying drawing figures in which like numerals represent like components

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

DETAILED DESCRIPTION

Figure 1A:
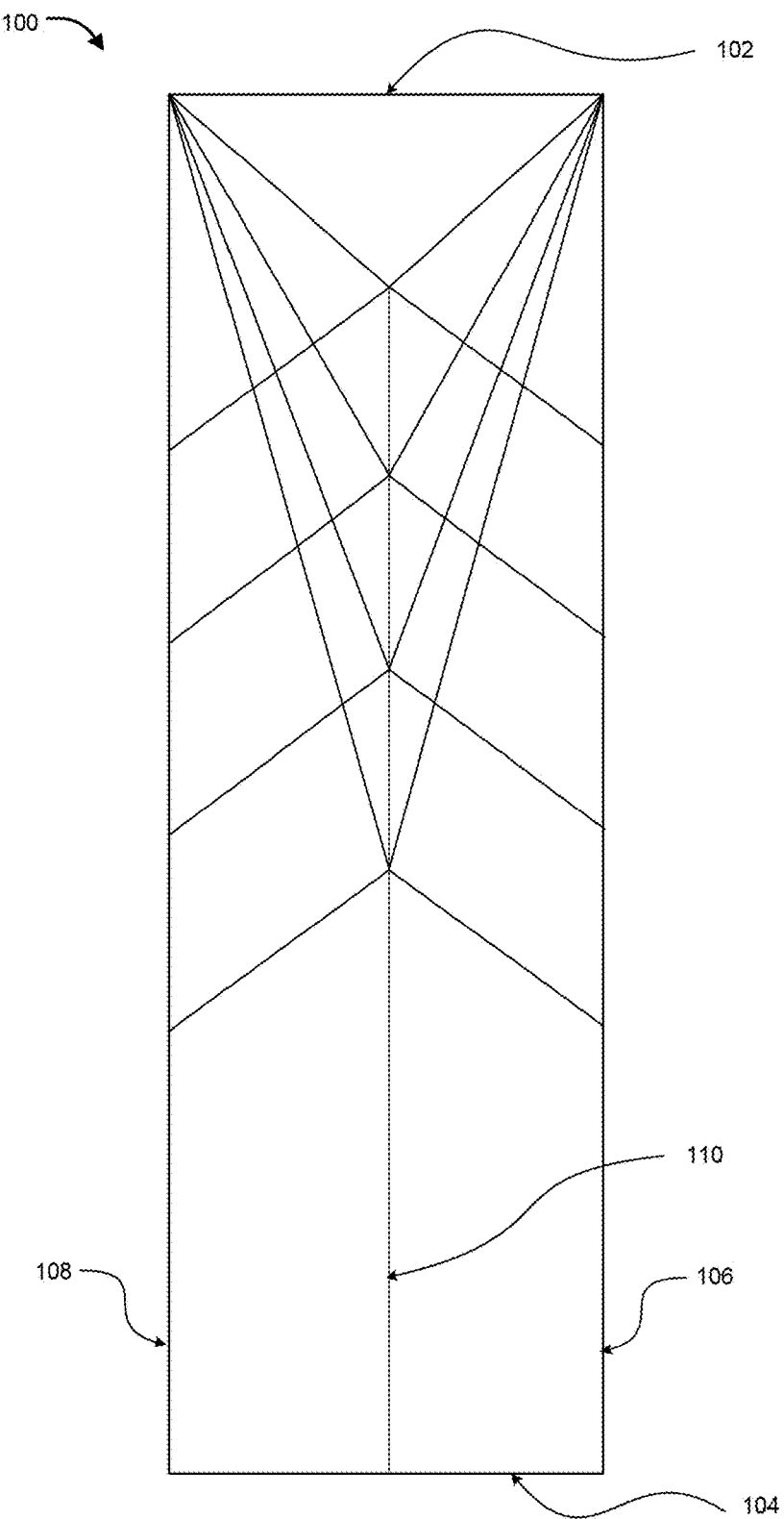
FIGS. 1A to 1E illustrate exemplary top views of the proposed measuring apparatus indicating scheme of hinges in accordance with embodiments of the present disclosure.

The following is a detailed description of embodiments of the disclosure depicted in the accompanying drawings. The embodiments are in such detail as to clearly communicate the disclosure. However, the amount of detail offered is not intended to limit the anticipated variations of embodiments; on the contrary, the intention is to cover all modifications, equivalents, and alternatives falling within the spirit and scope of the present disclosure as defined by the appended claims.

Each of the appended claims defines a separate invention, which for infringement purposes is recognized as including equivalents to the various elements or limitations specified in the claims. Depending on the context, all references below to the "invention" may in some cases refer to certain specific embodiments only. In other cases it will be recognized that references to the "invention" will refer to subject matter recited in one or more, but not necessarily all, of the claims.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Various terms are used herein. To the extent a term used in a claim is not defined below, it should be given the broadest definition persons in the pertinent art have given that term as reflected in printed publications and issued patents at the time of filing.

Existing solutions for measuring substances especially in domestic scenario, provide devices like measuring cups and spoons. These devices include enclosures in which the required substances can be placed and measured. But while storing away when not in use, these enclosures occupy a lot of space.

Most of these solutions have different tools for different quantities of measurement. The ones which are adjustable have several parts, increasing their complexity. Therefore, both types of solutions require more than a single physical part to be able to measure more than one quantity of measurement The present invention seeks to provide a single piece flat apparatus for measuring different volumes of a chosen substance that may be formulated in any or combination of a solid formulation, a liquid formulation, a semi-solid formulation, a semi-liquid formulation.

In an aspect, the apparatus can include plurality of marked hinges along which the flat apparatus can be bent. Portion of the apparatus thus bent forms an enclosure and acts as a scoop capacity of predetermined volume to fill the substance whereas other portion works as handle.

In an embodiment, the apparatus surface can include measuring marks that help in judging the quantity of the substance. The apparatus allows the desired volumetric measurement to be set according to which of the hinges are flexed.

In an aspect, flattening of the apparatus allows for convenient storage and cleaning. In another aspect, the proposed apparatus can be realized with a single piece of material, which makes it cost-effective and easy to handle.

Thus the present disclosure provides an apparatus for measuring or scooping out a predetermined quantity of a substance in liquid, semi liquid, gel or powder form. The disclosed apparatus helps in creating measuring or scooping space of different predetermined volumes and thus can be utilized for measuring varying quantities. Furthermore the disclosed apparatus is flat when not in use, and thus is convenient from the point of view of cleaning, storage or many other similar attributes.

FIGS. 1A to 1E illustrate flat structure of the apparatus 100 (interchangeably referred to as flat apparatus 100) in which different marked hinges are present. In a preferred embodiment, as shown in FIG. 1A, the flat apparatus 100 can be of rectangular shape having a longish configuration. For example, the flat apparatus 100 can have four sides comprising two narrower sides such as front end 102 and rear end 104, and two longish sides such as side 106 and side 108. The flat apparatus can include a plurality of hinges on its surface configured to enable bending of the flat apparatus along them while the remaining apparatus remains flat. The hinges are organized in a fashion that selecting some of them and bending the apparatus 100 along them creates a capacity of a predetermined capacity. Thus different combinations of the hinges can be selected to create different capacities on as required basis.

In an embodiment, the plurality of hinges can include a longitudinal hinge such as a first hinge 110 that is placed longitudinally along the centre axis along the length of the apparatus 100 starting from the rear end 104 and extending towards the front end 102 but falling short of the front end 102 of the apparatus.

Figure 1B:
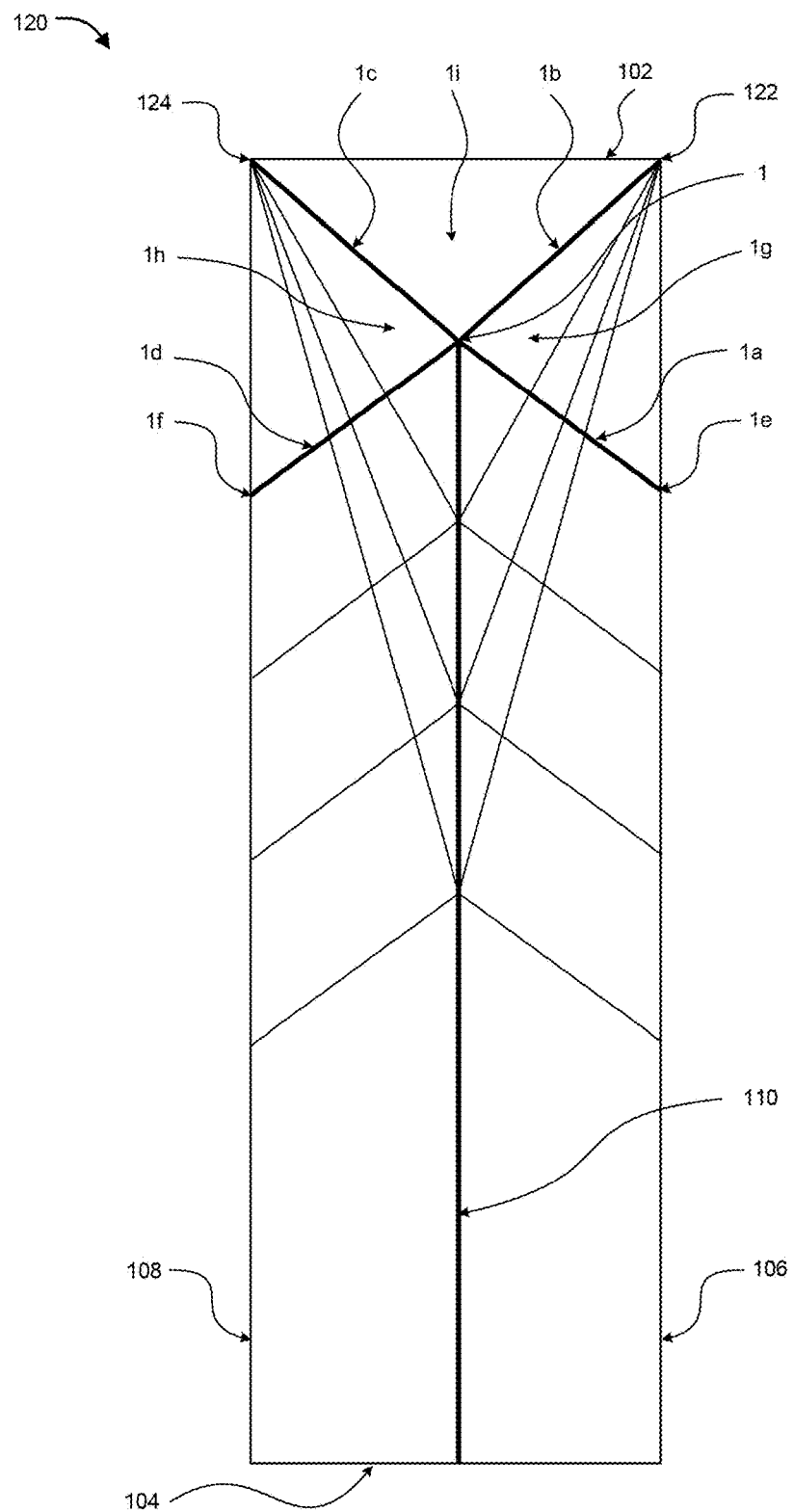
Figure 1C:
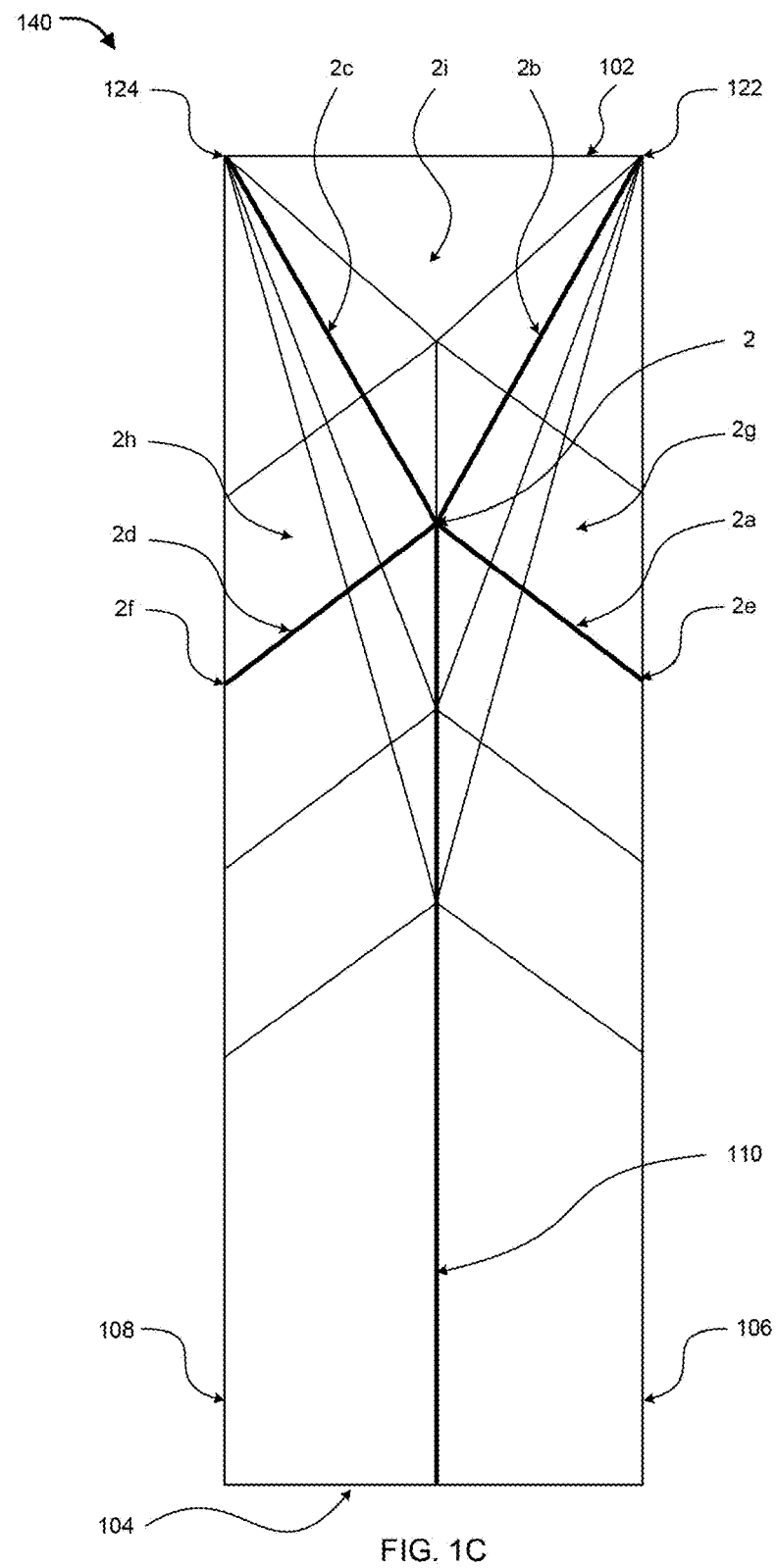
Figure 1D:
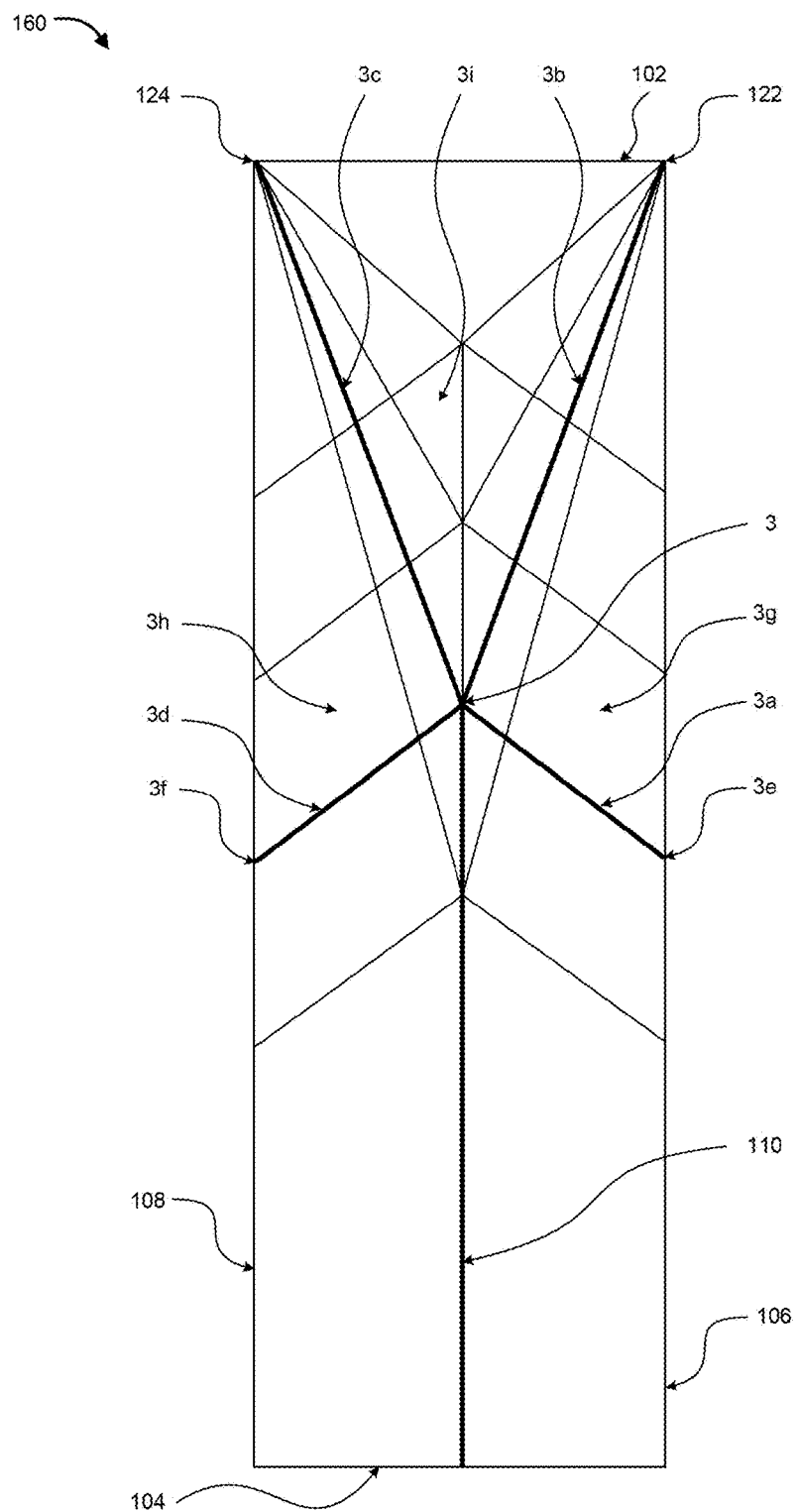
Figure 1E:
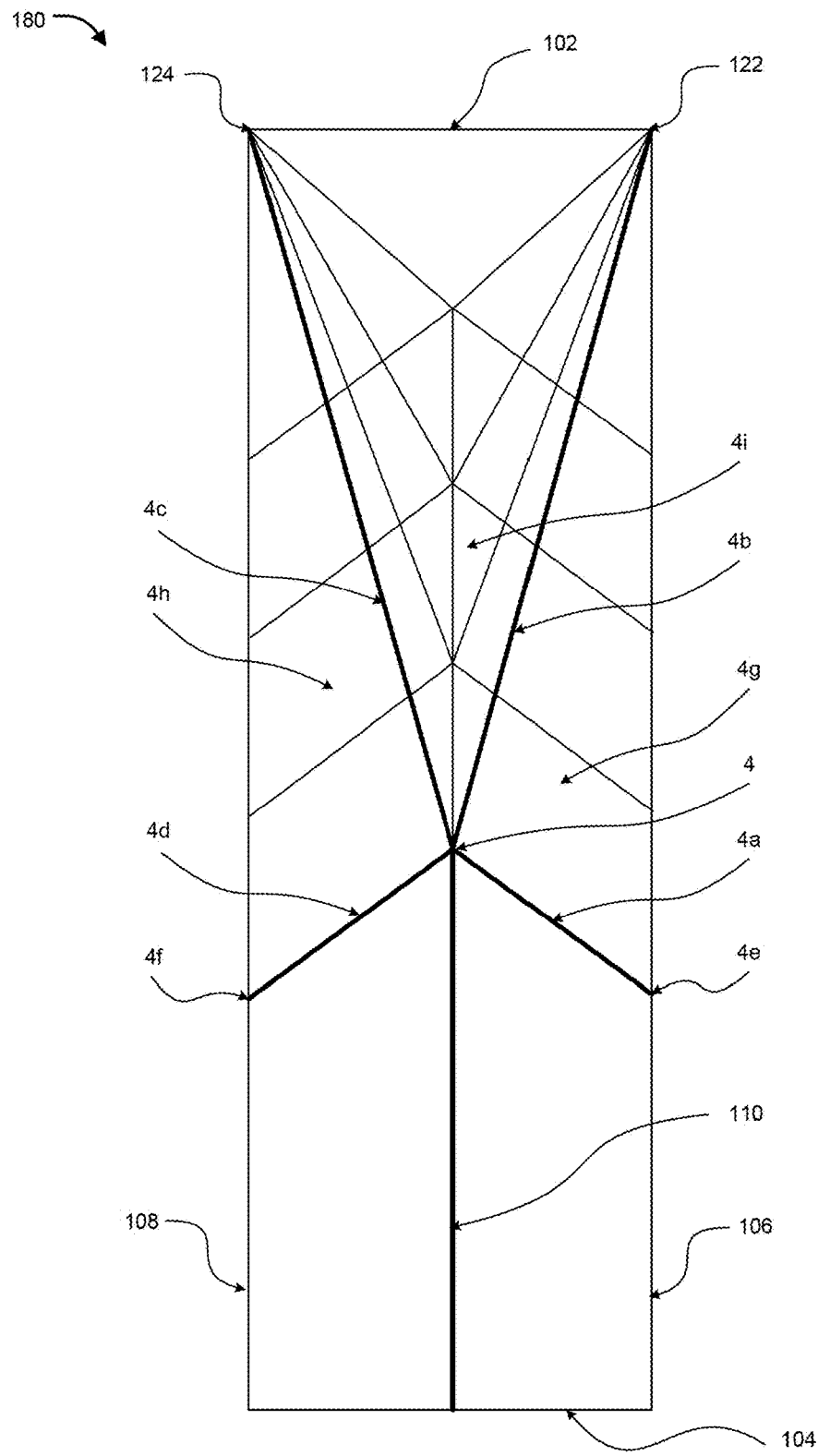

In an embodiment, the apparatus 100 can include a second set of hinges, wherein the second set of hinges can include a plurality of groups of hinges. In a preferred embodiment, each group of the second set of hinges can include four hinges. FIGS. 1B to 1E illustrate different groups of second set of hinges (in bold) such as a first group, a second group, and a third group and a fourth group respectively. In an embodiment, each of the four hinges such as 1a, 1b, 1c and 1d (refer FIG. 1B) belonging to the first group, emanates from a common point such as point 1 (of FIG. 1B) on the first hinge 110. Further two of the four hinges belonging to a group are placed symmetrically on either side of the first hinge 110 (as shown in FIG. 1B where 1a and 1b are on one side, and 1c and 1d are on other side). Further two of these four hinges (1b and 1c for the first group as shown in FIG. 1B) extend from the point (such as point 1 for the first group), to end at two corners 122 and 124 of the front end 102, and other two hinges extent from the point (point 1 of FIG. 1B) rearwards to end at a point (1e and 1f for the first group in FIG. 1B) on two side edges (106 and 108 respectively) of the rectangular flat. Hinges belonging to other groups i.e. the second group, the third group and fourth group of the second set of hinges are similarly configured as shown in bold in FIGS. 1C, 1D and 1E.

In an embodiment, bending of the flat apparatus 100 along a group of second set of hinges such as the first group (1a to 1d) in combination with the first hinge 110 along its length from the point 1 corresponding to the selected first group of hinges to its end at the rear end 104 of the apparatus 100 creates a predetermined capacity to hold a substance and the created space can be used for purpose of measuring.

Figure 2:
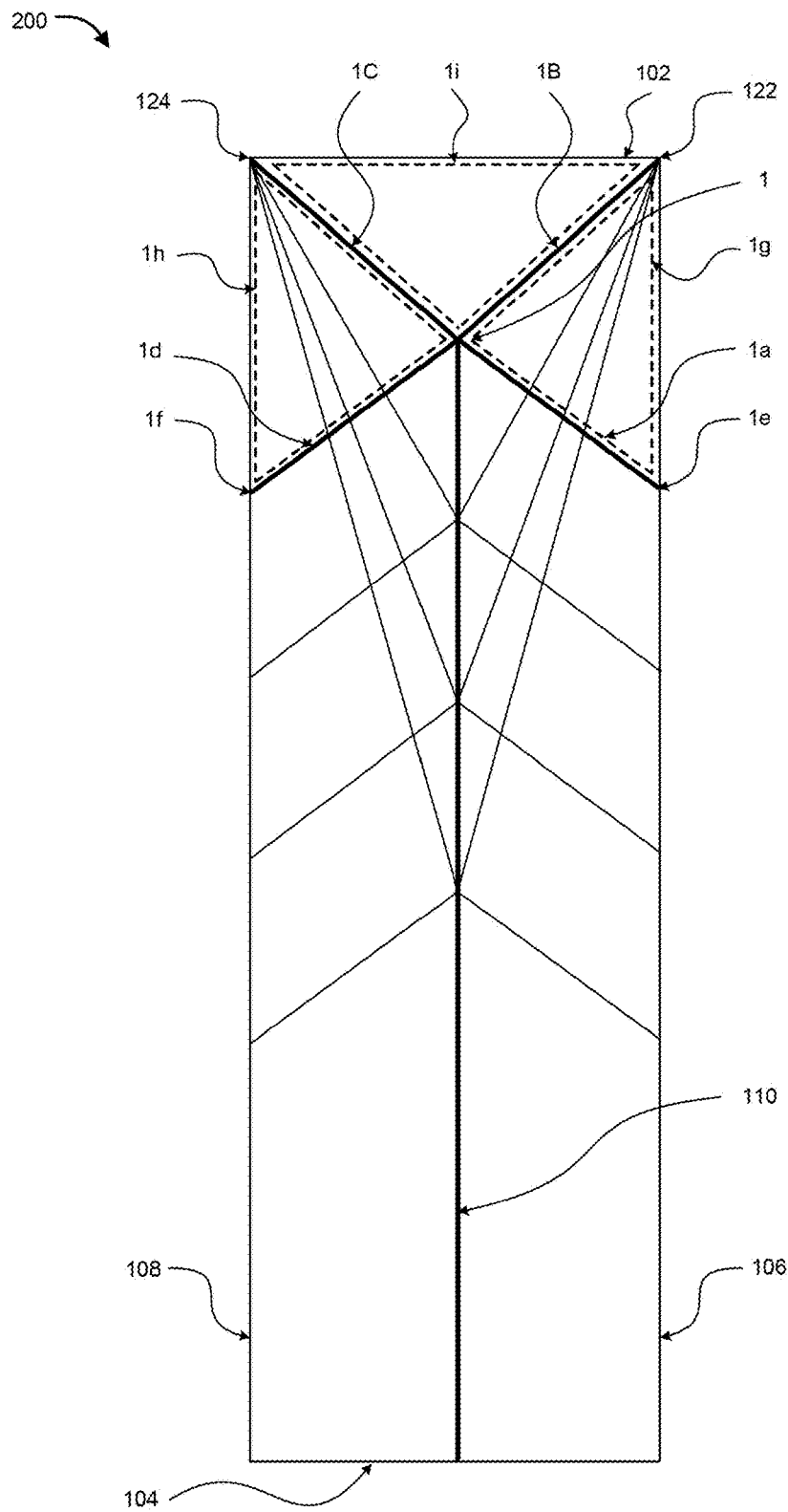
FIG. 2 illustrates an exemplary top view of the proposed measuring apparatus indicating triangles that form tetrahedron to create a scoop capacity in accordance with embodiments of the present disclosure.

In an embodiment, folding the apparatus 100 along the hinges as above creates a regular or irregular tetrahedron, and the predetermined capacity to hold a substance is within the tetrahedron and is bound by three triangles. The three triangles are formed by section of the flat apparatus 100 bound by hinges belonging to the selected group of hinges, front end 102 of the apparatus and two sides 106/108 of the apparatus. For example, if the first group of hinges is used to create the capacity, the capacity shall be bound within triangles 1g, 1h and 1i as depicted in FIG. 2.

In an embodiment, a pressure can be applied at points where the two rearward pointing hinges such as 1c/1d or 2c/2d or 3c/3d or 4c/4d, belonging to a particular group of second set of hinges join the sides 108/106 (for example points 1e/1f or 2e/2f or 3e/3f or 4e.4f respectively) to fold and turn the apparatus 100 into different shapes, and form scoops of different capacities within which a substance can be filled. Substance can be formulated in any or combination of a solid formulation, a liquid formulation, a semi-solid formulation, a semi-liquid formulation.

Figure 3:
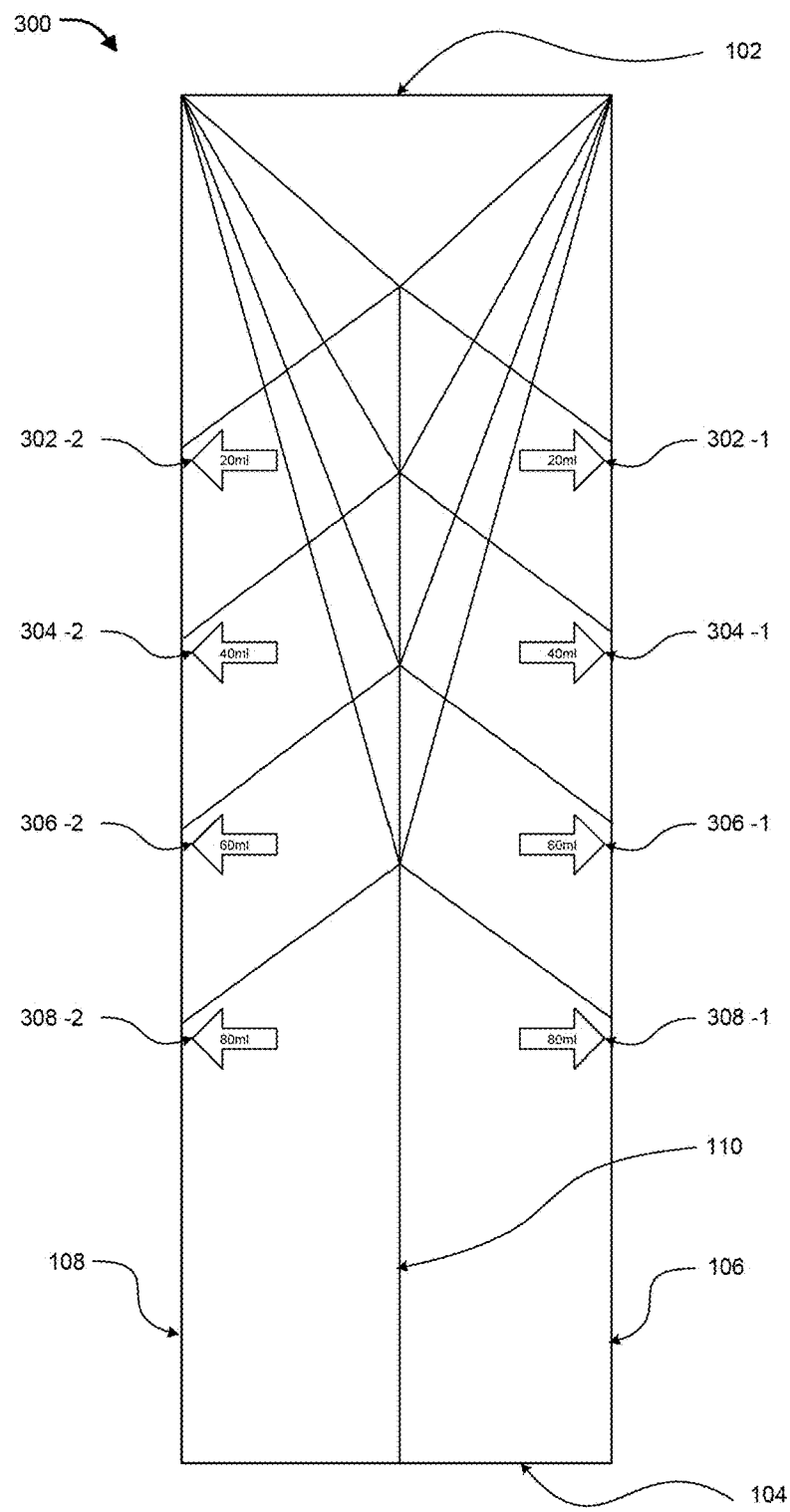
FIG. 3 illustrates an exemplary top view of the proposed measuring apparatus indicating markings pertaining to different scoop capacities in accordance with embodiments of the present disclosure.

FIG. 3 illustrates an exemplary top view 300 of the flat apparatus 100 showing markings at points where pressure can be applied to bend the flat apparatus 100 and create scoop capacities of varying amount. Pairs of markings such as 302-1 and 302-2 can be provided on two opposite sides 106/108, and there can be one pair for each group of hinges such as 302 for the first group, 304 for the second group and so on as shown in FIG. 3.

In an embodiment, the markings can also incorporate volume of the scoop capacity created by bending the flat apparatus 100 at that point. Thus depending on quantity to be scooped by a user he can select an appropriate marking and press the flat apparatus 100 by holding the two opposite sides 106/108 to create the desired capacity. FIG. 3 shows different volumes such as 20 ml, 40 ml, 60 ml and 80 ml for each pair of markings 302, 304, 306 and 308 respectively. it is to be appreciated that different volumes such as 20 ml, 40 ml, 60 ml and 80 ml shown in FIG. 3 are only indicative and volume can increase or decrease and accordingly these markings depending on size of the apparatus 100 and location of the hinges belonging to different groups.

In an embodiment, scoop volumes marked on the apparatus such as those in pairs of markings 302/304/306/308 can be in terms tablespoons such as ½, 1, 1½, etc, tablespoons, or in terms of say any other volume unit. However, in another embodiment, varying the number and granularity of marked measuring levels are completely within the scope of the present disclosure.

In an embodiment, the flat apparatus 100 shown in FIG. 1 can be made of a suitable material such as but not limited to a polymer material such as polypropylene or of any other sufficiently rigid and strong plastic or materials such as silicon, and the like, or a combination of any number of materials.

Figure 4:
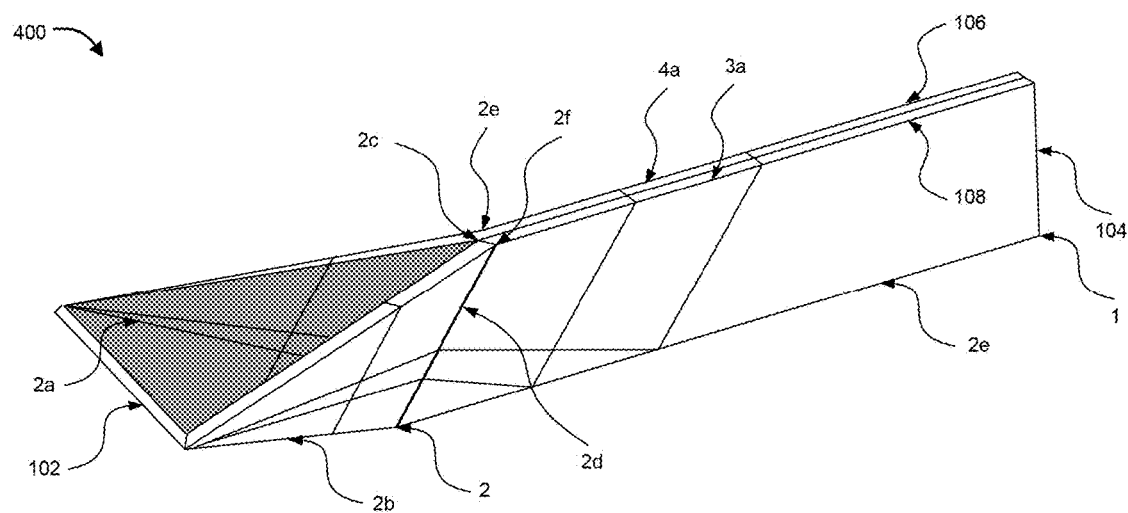
FIG. 4 illustrates an exemplary perspective view of measuring apparatus of the present invention, in one of its multiple folded states in accordance with an embodiment of the present disclosure.

FIG. 4 illustrates an exemplary diagram 200 showing the flat apparatus 100 in folded condition to create a holding capacity. In the exemplary diagram, the apparatus 100 has been folded along hinges belonging to the second group i.e. hinges 2a, 2b, 2c and 2d as shown in the diagram 200. In an aspect, bending of the apparatus along a group of hinges in combination with the first hinge 110 can be done by application of pressure at specific points on the sides 106 and 108, and these points can be the points 2e and 2f at which rearward extending hinges i.e. 2c and 2d of the group join the sides 106/108. To help user to use the apparatus these points have additionally been provided with markings such a 304-1 and 304-2 respectively as shown in FIG. 3. For instance, if pressure to fold the flat apparatus 100 is applied at markings 304-1 and 304-2 (points 3e and 2f), the portion of edges 106 and 108 move towards each other and they get temporarily joined and rest of the apparatus 100 toward front end 102 bend along hinges to forms scoop capacity of predetermined volume to carry the substance. As depicted grey in FIG. 4, part of the apparatus takes shape of a cup/scoop to carry substance within the capacity of the cup. The measuring marks present on the surface at appropriate place help in judging how much quantity is to be measured. In another embodiment, pressure can be applied on any ends of hinges such as 1e/1f or 2e/2f or 3e/3f etc. based on the measuring mark and quantity of substance required.

As can be seen from FIG. 4, folding of the apparatus 100 creates two portions in the apparatus. First portion is used to carry the substance in scoop, and the second portion in which side edges 106/108 are temporarily joined, works as a handle to hold the apparatus. Length of the handle shall dependent on measuring mark where pressure is applied.

In another embodiment, if pressure is applied at 3e/3f (pair of marks 306) the substance carrying volume/space shall be more than if pressure were to be applied at 1e/1f (pair of marks 302). Further, more the scoop area lesser the handle length.

In another embodiment, to separate the temporarily joined side edges 106/108, pressure is required to be applied in the same way as to join them. Separation of the side edges 106/108 shall make the apparatus 100 flat as depicted in FIG. 1A.

In an embodiment, in order to hold the side edges 106/108 together to form a temporary joint, magnets can be incorporated within the flat apparatus 100 so as to provide magnetic attraction to the two sides. The magnets can be placed on the surfaces or on the side edges 106/108. In an alternate embodiment, the side edges 106/108 edges can be held together in folded condition of the apparatus 100 by other means such as snap joints, physical pressure and like. If physical pressure is applied to make the temporary joint, no separate pressure is required to segregate the edges. When pressure applied to create joint is removed, apparatus 100 will automatically gets flattened.

In an embodiment, the scoop or cup or capacity created by folding the apparatus 100 can be filled by any substance, including but not limited to solid, powder, mixture and liquid. It is easy to fill the substance into the scoop by using any method, including, but not limited to, pouring the substance and get the substance of desire into created cup. Substance can also be processed via empty-filling-emptying the substance into the cup.

Once the apparatus 100 is in folded state, substance requiring measurement can be filled in scoop using any method including, but not limited to, pouring the substance into the cupped volume, scooping the substance with the apparatus 100 itself, and the like.

The apparatus 100, in any shape, can be cleaned by any method, including, but not limited to, washing under tap, by using detergent, and the like Its a waterproof, rust free apparatus for multiple volumetric measurements depending on how it is folded. The flat nature of the apparatus allows for convenient cleaning of unwanted substances from its surface. Furthermore, it allows for an extremely small footprint, enabling convenient storage.

An exemplary use for the apparatus could be measuring tablespoons.

In broad embodiment, the present invention is a flat measuring apparatus, which folds up in different ways to achieve different volume.

While the foregoing describes various embodiments of the invention, other and further embodiments of the invention may be devised without departing from the basic scope thereof. The scope of the invention is determined by the claims that follow. The invention is not limited to the described embodiments, versions or examples, which are included to enable a person having ordinary skill in the art to make and use the invention when combined with information and knowledge available to the person having ordinary skill in the art.

I claim:

1. A flat apparatus for measuring volume of a substance formulated in any or combination of a solid formulation, a liquid formulation, a semi-solid formulation, a semi-liquid formulation, said apparatus comprising:

a plurality of hinges configured on the apparatus in order to bend the apparatus along the hinges;
wherein the flat apparatus is of rectangular shape having two narrower front end and rear end, and two longer sides, and wherein the plurality of hinges comprise;
  a first hinge that is configured longitudinally along the center axis along the length of the apparatus starting from the rear end and falling short of the front end of the apparatus; and
  a second set of hinges, wherein the second set of hinges comprise a plurality of groups of hinges with each group comprising four hinges, wherein each of the four hinges belonging to a group emanates from a point on the first hinge, and wherein two of these four hinges extend from the point to end at two corners of the front end, and each of the other two extends from the point rearwards to end at a point on the two sides of the apparatus;
wherein bending of the apparatus along a group of second set of hinges in combination with the first hinge along its length from the point corresponding to the selected group of hinges to its end at the rear end of the apparatus creates a predetermined capacity to hold the substance; and
wherein the predetermined capacity depends on the selected group of second set of hinges.

2. The apparatus of claim 1, wherein the created predetermined capacity to hold the substance is of regular or irregular tetrahedron shape, and wherein the created capacity is bound by three triangles, wherein the three triangles are formed by section of flat apparatus bound by hinges belonging to the selected group of hinges, front end of the apparatus and two sides of the apparatus.

3. The apparatus of claim 1, wherein the apparatus incorporates magnets configured to keep the apparatus in folded condition, and the magnets are placed on the two sides of the apparatus to hold the two sides together.

4. The apparatus of claim 1, wherein the apparatus is constructed of the material selected from the group consisting of polymer, silicon, flexible substrate.

5. The apparatus of claim 1, wherein the apparatus has a plurality of marking levels according to which substance is scooped in desired quantity.

6. The apparatus of claim 1, wherein the apparatus is made of a single piece material.

* * * * *